US008833773B2

(12) United States Patent
Allis et al.

(10) Patent No.: US 8,833,773 B2
(45) Date of Patent: Sep. 16, 2014

(54) WORKHOLDING APPARATUS FOR WORKPIECE TRANSFER

(75) Inventors: Donald L. Allis, Churchville, NY (US); Richard N. Russell, Conesus, NY (US)

(73) Assignee: The Gleason Works, Rochester, NY (US)

( * ) Notice: Subject to any disclaimer, the term of this patent is extended or adjusted under 35 U.S.C. 154(b) by 417 days.

(21) Appl. No.: 13/226,548

(22) Filed: Sep. 7, 2011

(65) Prior Publication Data
US 2012/0061926 A1 Mar. 15, 2012

Related U.S. Application Data

(60) Provisional application No. 61/382,066, filed on Sep. 13, 2010.

(51) Int. Cl.
*B23B 31/16* (2006.01)
*B23B 31/39* (2006.01)
*B25B 1/24* (2006.01)

(52) U.S. Cl.
CPC ............ *B23B 31/16279* (2013.01); *B25B 1/24* (2013.01); *B23B 2260/136* (2013.01); *Y10S 279/901* (2013.01)
USPC ........... 279/124; 279/106; 279/110; 279/136; 279/137; 279/140; 279/901

(58) Field of Classification Search
USPC ......... 279/124, 106, 110, 136, 137, 140, 901, 279/35, 46.7, 123, 152
See application file for complete search history.

(56) References Cited

U.S. PATENT DOCUMENTS

| 3,108,412 | A | * | 10/1963 | Benjamin et al. | ............ 451/398 |
| 4,667,972 | A | * | 5/1987 | Hiestand | ................ 279/123 |
| 4,946,177 | A | | 8/1990 | Barbieux | |
| 5,015,003 | A | | 5/1991 | Ramunas | |
| 8,152,175 | B1 | * | 4/2012 | Maro et al. | ................ 279/123 |
| 2010/0038867 | A1 | | 2/2010 | Dejonghe et al. | |

FOREIGN PATENT DOCUMENTS

EP 0352162 A1 1/1990
JP 58-109207 A 6/1983

OTHER PUBLICATIONS

International Search Report & Written Opinion for PCT/US2011/050599.
Patent Abstracts of Japan, JP 58-109207 published Jun. 29, 1983, Mitsubishi Electric Corp.

* cited by examiner

*Primary Examiner* — Eric A Gates
*Assistant Examiner* — Chwen-Wei Su
(74) *Attorney, Agent, or Firm* — Robert L. McDowell

(57) ABSTRACT

A workholding apparatus comprising a chuck body, first jaw members and second jaw members wherein the second jaw members are shaped to grip a workpiece of a particular geometry. The first and second jaw members are constructed to enable easy, quick and manual replacement of the second jaw members with other second jaw members having different grip shapes so as to enable gripping of workpieces with different geometries.

10 Claims, 10 Drawing Sheets

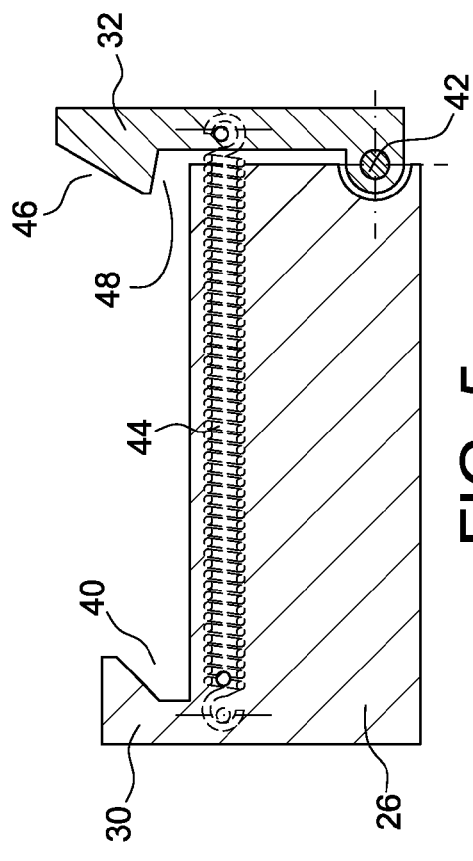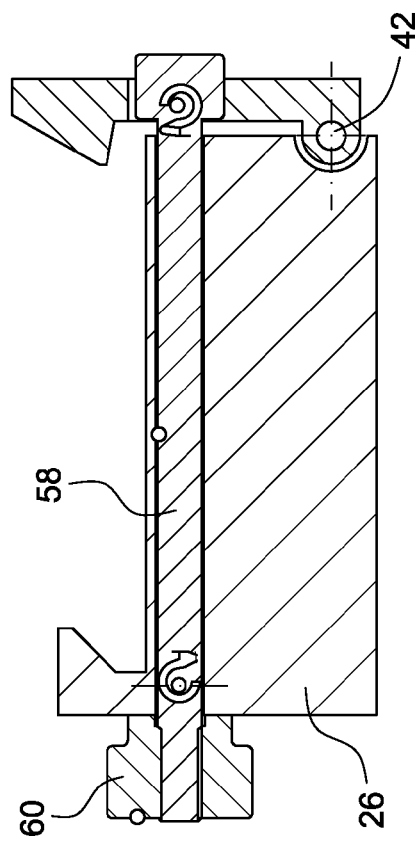

WORKHOLDING APPARATUS FOR WORKPIECE TRANSFER

This application claims the benefit of U.S. Provisional Patent Application No. 61/382,066 filed Sep. 13, 2010 the entire disclosure of which is hereby incorporated by reference.

FIELD OF THE INVENTION

The present invention is directed to a workholding apparatus for machine tools. In particular, the workholding apparatus is especially suited for holding various sizes of workpieces on a machine tool transfer device.

BACKGROUND OF THE INVENTION

In metalworking operations where a workpiece is machined, equipment of some type is necessary to hold the workpiece in position in a machine tool so the machining process can be successfully carried out. This type of equipment is known as "workholding" equipment.

It is well known in machining processes for a workpiece to be transported to and/or from the workholding equipment via transfer device. In one known embodiment, workpieces are transferred between a cutter spindle and an auxiliary spindle where another process (e.g. chamfering) may be carried out. One manner of transferring a workpiece between spindles is via a rotary transfer arm. The rotary arm usually comprises a pair of workholding devices (e.g. chucks) that grasp a workpiece during the transfer. Each chuck usually includes a gripper device comprising a plurality (e.g. two or three) of jaws. The form of the grippers is usually one which compliments the form of that portion of workpiece to be gripped. In bevel gear manufacture, for example, different jaw forms or shapes would be required depending upon whether the part being gripped is a bevel pinion or a bevel ring gear as can be appreciated by the artisan.

On a machine having a transfer mechanism, a change in the type of workpiece being processed usually requires a change in the type and/or shape of the jaws of the chucks on the transfer mechanisms. Generally, this involves removing of a plurality of bolts to release each jaw from its associated chuck body and replacing the bolts when securing the replacement jaw to the chuck body. Such a task is time consuming, requires one or more tools and presents the possibility of thread damage to the bolts and/or chuck body.

It is an object of the present invention to provide a gripping apparatus whereby jaws are quickly and easily exchanged without the need for tools.

SUMMARY OF THE INVENTION

The present invention is directed to a workholding apparatus comprising a chuck body, first jaw members and second jaw members wherein the second jaw members are shaped to grip a workpiece of a particular geometry. The first and second jaw members are constructed to enable easy, quick and manual replacement of the second jaw members with other second jaw members having different grip shapes so as to enable gripping of workpieces with different geometries.

BRIEF DESCRIPTION OF THE DRAWINGS

FIG. 5 is a cross-sectional view of a first jaw member with a closure spring.

FIG. 6 is a cross-sectional view of a first jaw member with a closure pin.

DETAILED DESCRIPTION OF THE PREFERRED EMBODIMENT

Figure 1:
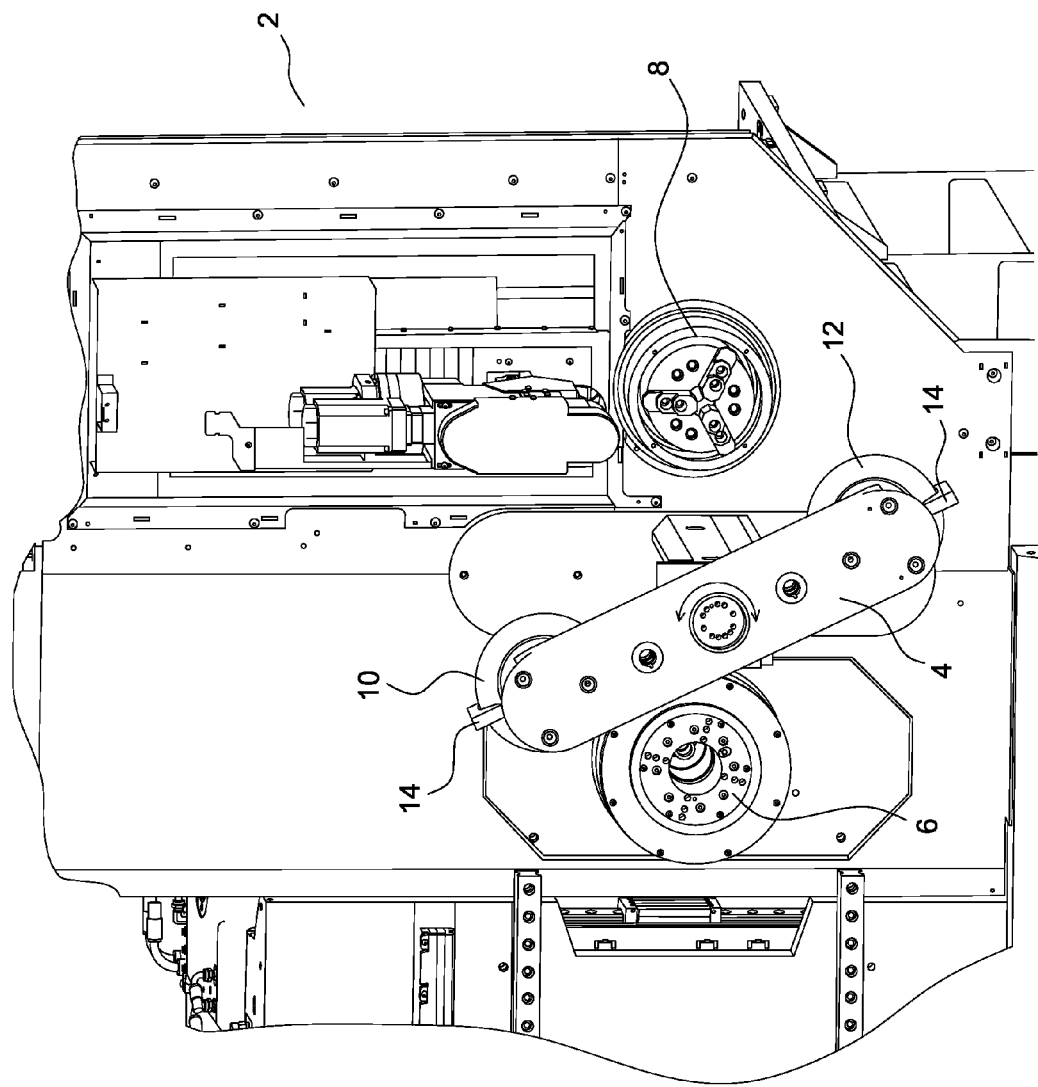
FIG. 1 is a partial front view showing two spindles and a rotary transfer arm of a gear manufacturing machine.
Figure 2:
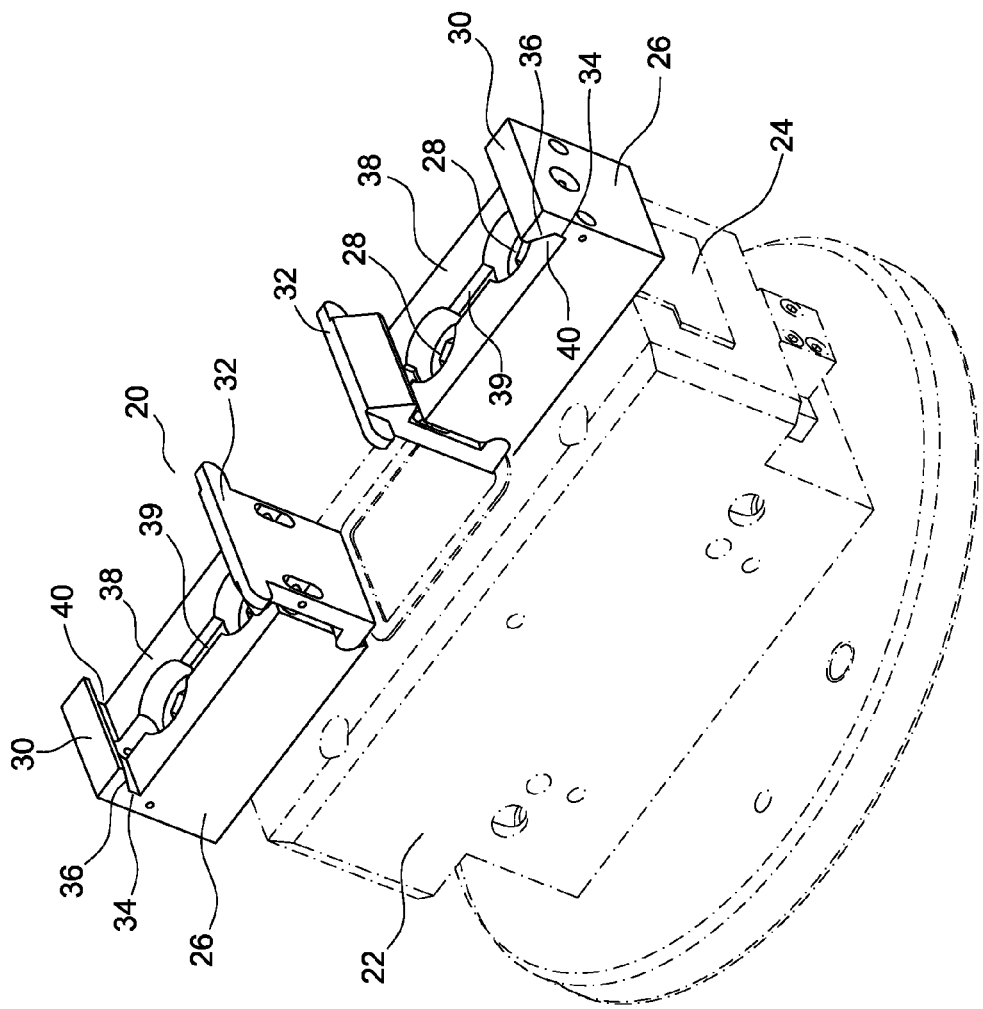
FIG. 2 illustrates a chuck body with first jaw members thereon.
Figure 3:
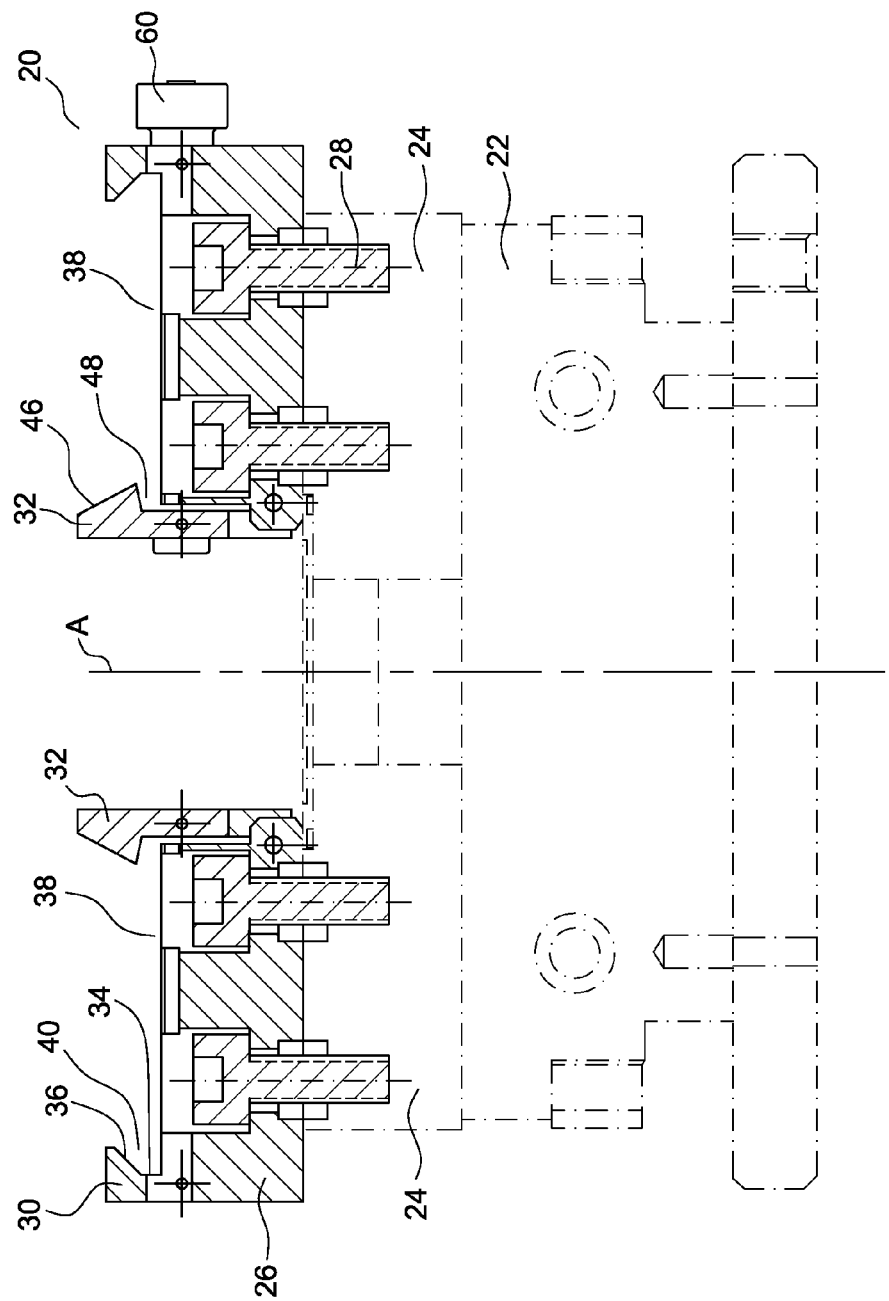
FIG. 3 is a cross-sectional view of the chuck body and first jaw members of FIG. 2.
Figure 4:
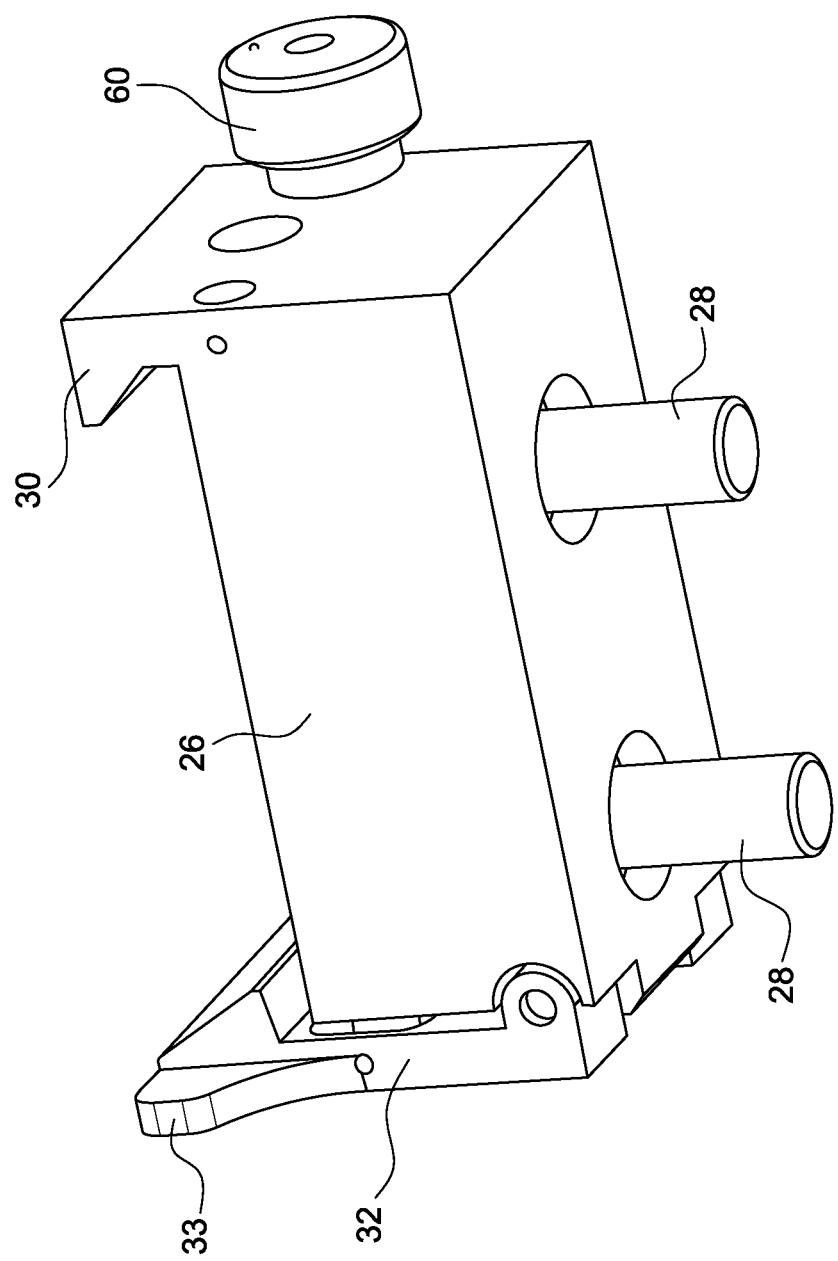
FIG. 4 is a perspective view of a first jaw member of the present invention.

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

FIG. 1 illustrates a known type of gear cutting machine 2 comprising a transfer arm 4. Upon the completion of a cutting process, the transfer arm 4 is actuated outwardly (i.e. away from cutter spindle 6 and auxiliary spindle 8) from a rest position and rotated to simultaneously grip a cut gear 10 on spindle 6 and a gear blank 12 on auxiliary spindle 8 via jaws 14 (two or more at each end of transfer arm 4), withdraw both workpieces from their respective spindles and then rotate (usually about 180 degrees) to bring the blank gear 12 to the work spindle 6 for cutting and the cut gear 10 to auxiliary spindle 8 for chamfering. Inward movement of the transfer arm 4 (i.e. toward the respective spindles) is then effected in order to load the gear blank 12 and cut gear 10 in their respective spindles. Once the workpieces are loaded, the transfer arm 4 returns to a rest position. Replacement of jaws 14 has been by removal of bolts as described above.

The inventors have addressed the noted deficiencies of the prior art with the chuck device 20 shown in FIGS. 2-6. Preferably, the chuck 20 includes a chuck body 22 comprising at least two opposed linear movable slides 24 that are actuated by known means (e.g. hydraulic, pneumatic, etc.). The chuck body 22 per se is commercially available, such as from Schunk GmbH & Co. KG, for example.

According to the invention, a first jaw member 26 is secured via a removable manner to each linear slide 24 such as by a pair of screws 28. Each first jaw member 26 includes an outer fixed gripping member, such as stop 30, and an opposed inner gripping member, such as clasp member 32, movable between an open release position and a closed gripping position. Wall portion 34 and first angular surface 36 of outer fixed stop 30 cooperate with planar surface 38 of first jaw member 26 to define a first groove 40 in each first jaw member 26. Clasp 32 is pivotable about a pin 42 (FIG. 5) near a first end thereof and is resiliently biased, such as by one or more springs 44, toward outer fixed stop 30. The second end of clasp 32 includes second angular surface 46 (FIG. 3) which terminates spaced from planar surface 38 thereby forming second groove 48 in the region between planar surface 38 and the terminus of second angular surface 46. With respect to the orientation of FIG. 3, first angular surface 36 faces generally toward planar surface 38 and second angular surface 46 faces generally away from planar surface 38. It should be understood that the positions of fixed stop 30 and clasp member 32 on first jaw member 26 may be reversed from the arrangement shown in FIG. 2.

Figure 7:
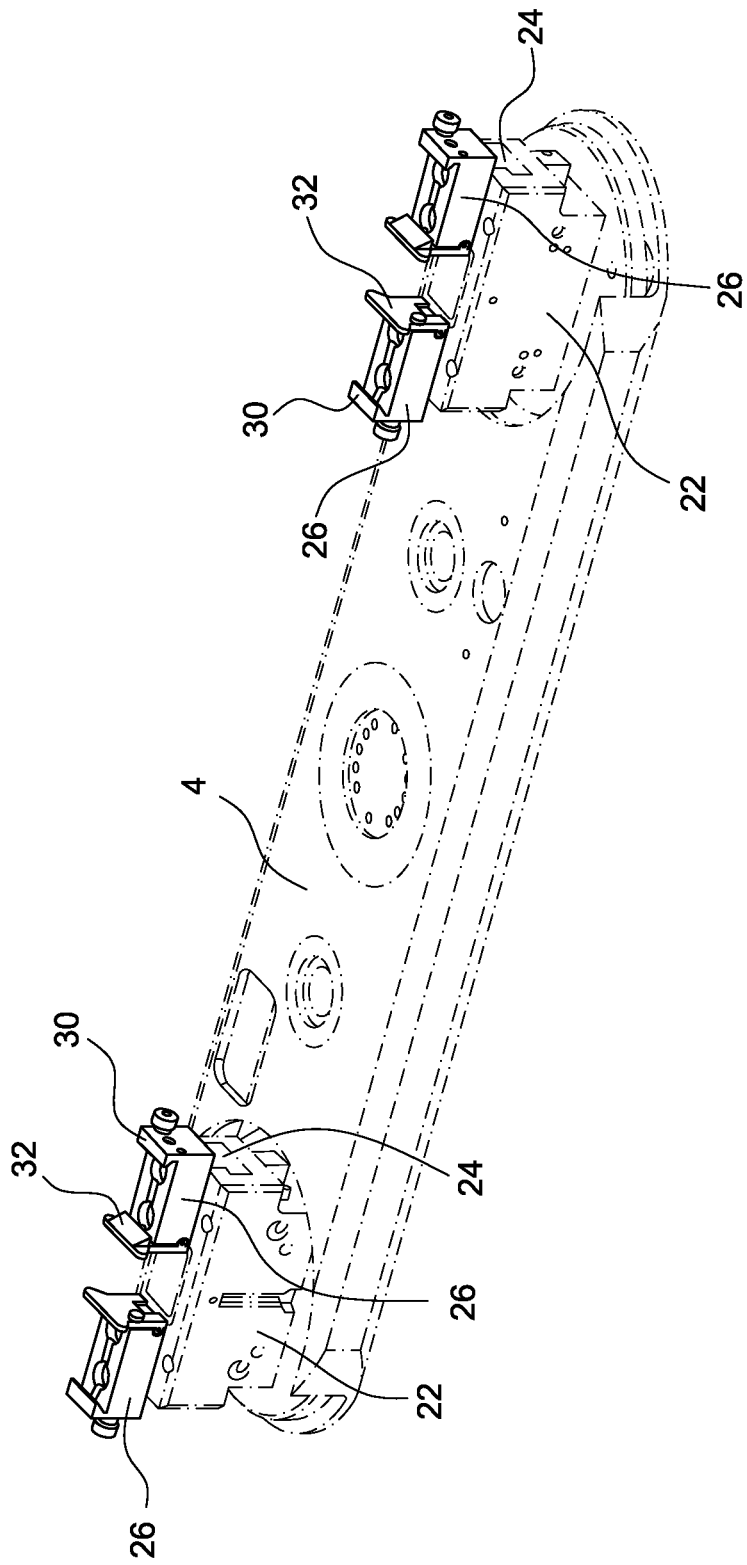
FIG. 7 illustrates a rotary transfer arm with the chuck body and first jaw members of FIG. 2.

FIG. 7 shows a transfer arm 4, of the type shown in FIG. 1, having chuck bodies 22 and a pair of first jaw members 26 positioned on each chuck body. It is to be understood that if desired, more than two first jaw members on a chuck body are also contemplated by the present invention. For example, a three jaw chuck may be utilized for gripping and transferring certain types of workpieces. In such an instance, the chuck body 22 would comprise three linear slides 24 circumferentially arranged preferably equidistantly from one another.

Figure 8:
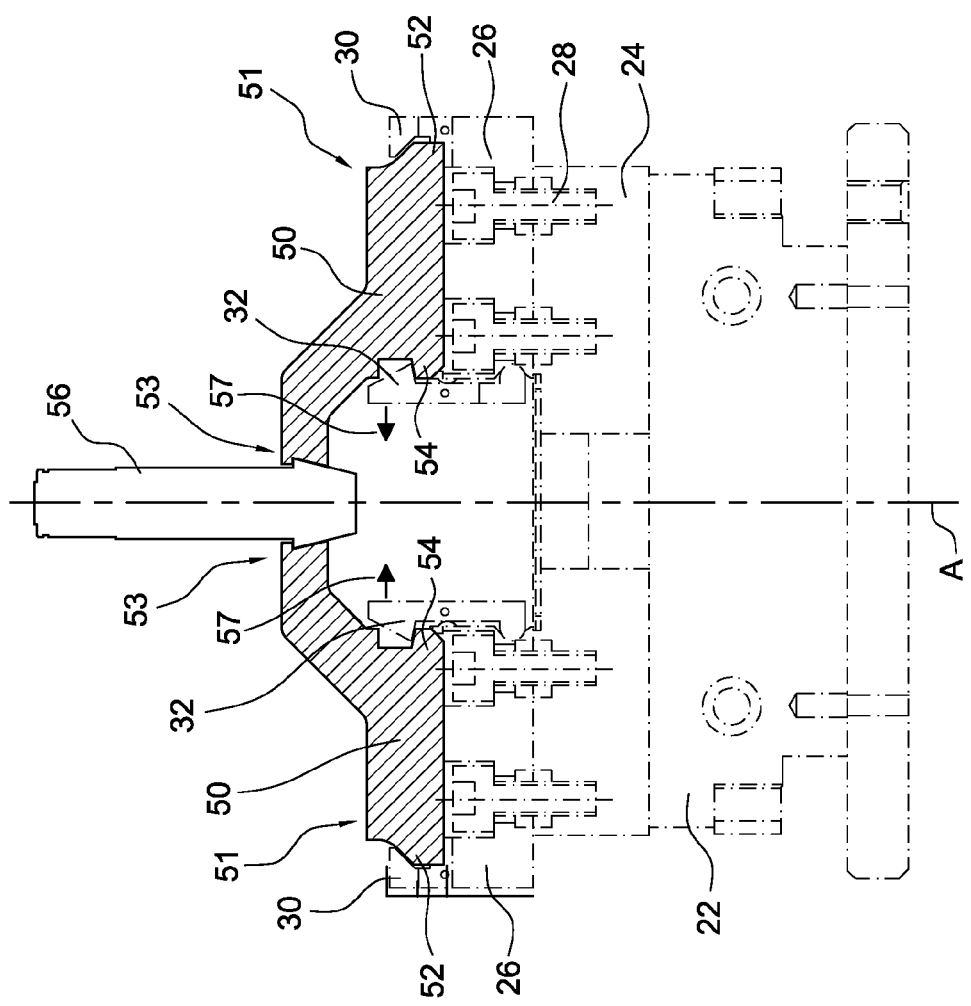
FIG. 8 shows second jaw members positioned on the apparatus of FIG. 3 for gripping a pinion.

FIG. 8 illustrates a further element of the present invention, namely, a second jaw member 50 which is insertable into and removable from each first jaw member 26 in a tool-less manner. Second jaw member 50 comprises a first end 51 having a first shoulder 52 which is preferably shaped generally complementary with the shape of first groove 40 and a second shoulder 54 which is preferably shaped generally complementary with the shape of second groove 48. First shoulder 52 is inserted into first groove 40 followed by sliding the second shoulder 54 along second angled surface 46 until it "snaps" into position in second groove 48 due to the spring action of the clasp member 32. The second jaw member 50 further preferably includes a key (not shown) on the bottom surface thereof that is insertable into a keyway 39 (FIG. 2) located in the planar surface 38 of first jaw member 26.

Second jaw member 50 also includes a second end 53 which has an end surface shaped so as to conform to the shape of the workpiece that is in contact with the second end 53 when gripped. In FIG. 8, the workpiece is a pinion member 56. Inward movement of slides 24 (toward axis A), which carry first jaw members 26 and second jaw members 50, results in gripping pinion member 56 while outward movement of slides 24 (away from axis A) results in pinion member 56 being released.

It should be noted that if additional holding force is desired for maintaining second jaw member 50 in position on first jaw member 26, a threaded pin 58 (FIG. 6) with hand tightened knob 60 may be included in addition to, or alternative to, spring member 44.

Figure 9:
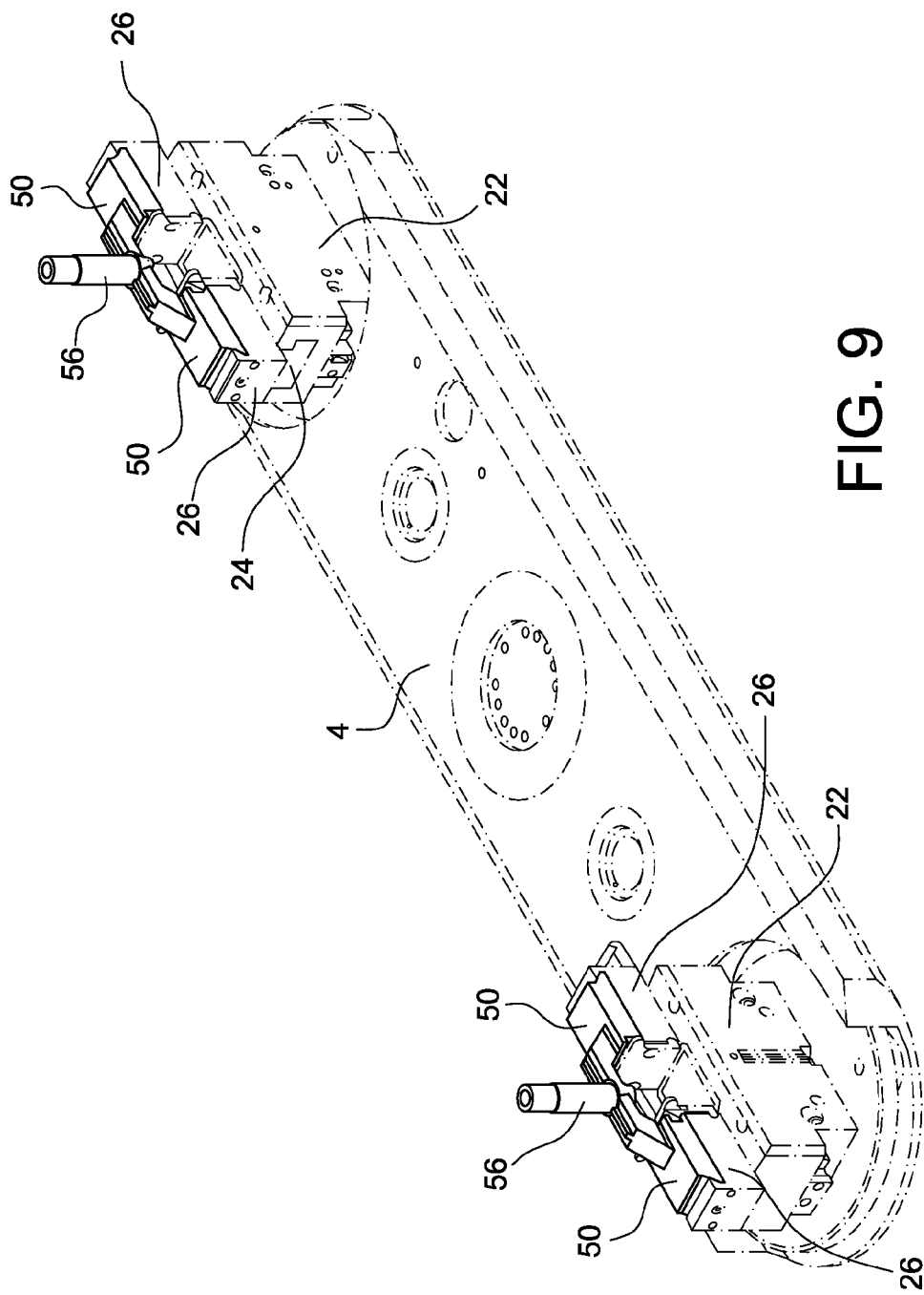
FIG. 9 illustrates a rotary transfer arm with the workholding apparatus of FIG. 8.

FIG. 9 shows a transfer arm 4 having the inventive workholding apparatus of FIG. 8 thereon. Chuck bodies 22, a pair of first jaw members 26 positioned on each chuck body and a pair of second jaw members 50 positioned on each first jaw member 26 comprise the apparatus for gripping pinion member 56 during transfer between machine spindles.

Figure 10:
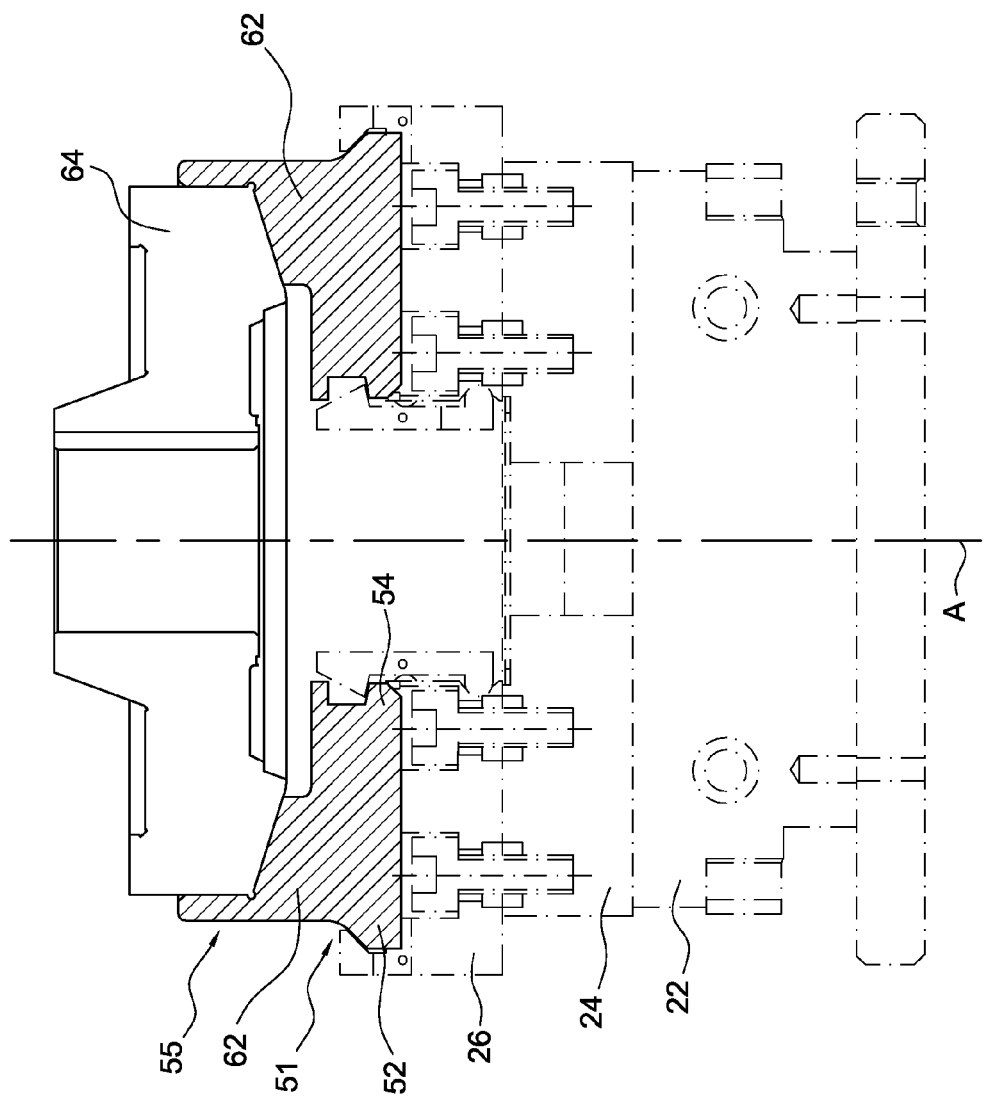
FIG. 10 shows second jaw members positioned on the apparatus of FIG. 3 for gripping a ring gear.

The present invention provides for fast, easy and tool-less changing of the second jaw member in order to grip another workpiece having a different outer geometry. In FIG. 10, for example, chuck body 22 and first jaw member 26 are unchanged from those of previous Figures. However, the second jaw member 62, while having the same first end 51, first shoulder 52 and second shoulder 54 as previously described, has a differently shaped second end 55 so as to be complementary in shape to the gripping surfaces of a ring gear member 64.

As an example, removing second jaw members 50 (FIG. 8) for replacement by second jaw members 62 (FIG. 10) is accomplished by opening the workholding apparatus 20 by moving slides 24 away from each other (away from axis A), manually removing threaded pin 58, 60 if present, manually opening each closure 32 (preferably via a gripping surface such as tabs 33 in FIG. 4) in the direction of arrows 57, and lifting second jaw member 50 from its position on first jaw member 26. Second jaw members 62 (or another second jaw member having a different form) may then be inserted into first jaw members 26 and snapped into place as previously described.

Figure 11:
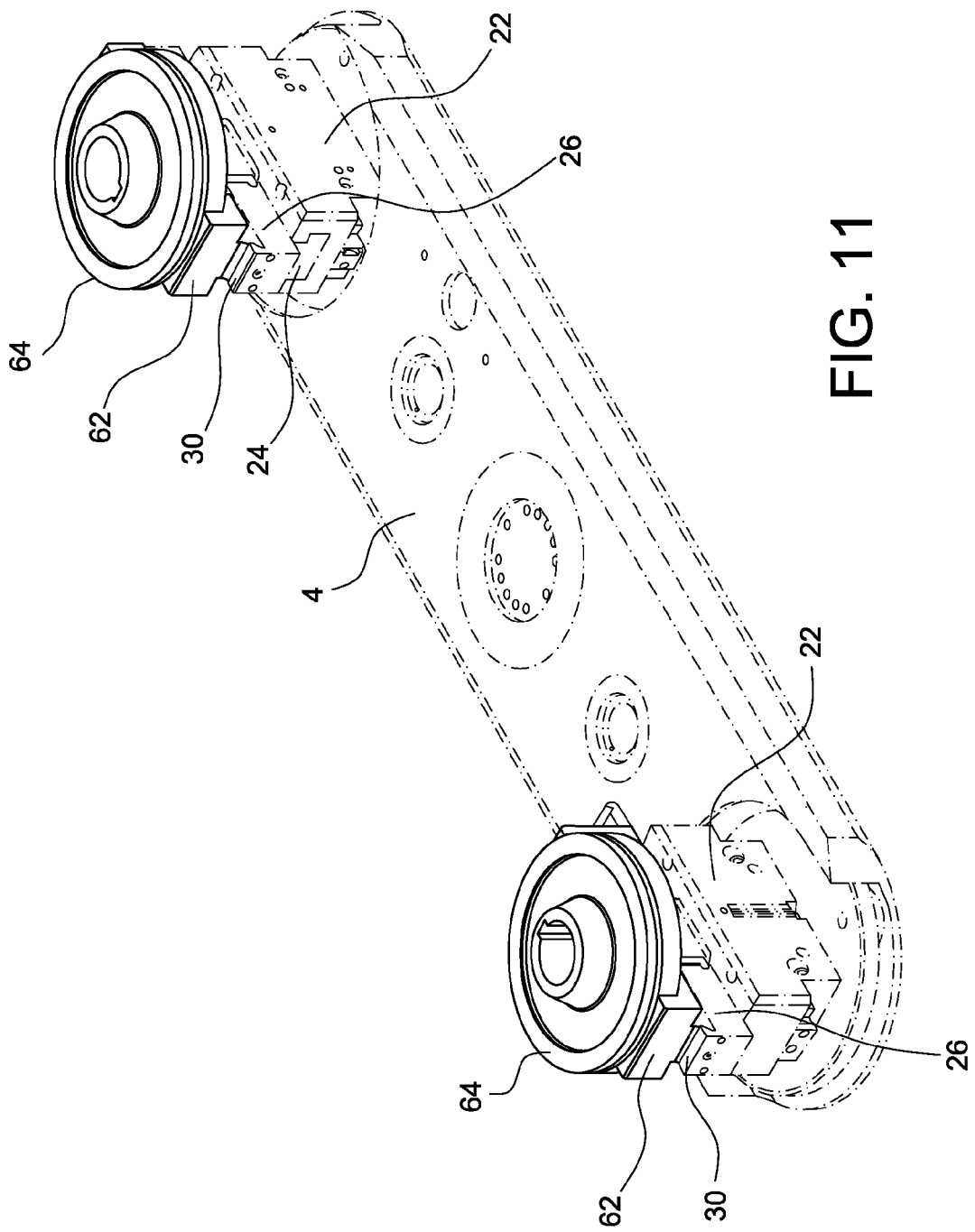
FIG. 11 illustrates a rotary transfer arm with the workholding apparatus of FIG. 10.

FIG. 11 shows a transfer arm 4 having the workholding apparatus of FIG. 10 thereon. Chuck bodies 22, a pair of first jaw members 26 positioned on each chuck body and a pair of second jaw members 62 positioned on each first jaw member 26 comprise the apparatus for gripping ring gear member 64 during transfer between machine spindles. With reference to FIGS. 9 and 11, changing the workholding apparatus of the transfer mechanism 4 from pinion gripping to ring gear gripping is one of removing second jaw member 50 and replacing it with second jaw member 62.

Of course, it can be appreciated that second jaw members having other second end geometries are also contemplated depending upon the form of the particular workpiece being gripped for transfer.

While the present invention has been shown as residing on a rotary transfer arm, the present invention is not limited thereto. The inventive workholding apparatus may be utilized in other workpiece transfer arrangements as well as in machining operations other than cutting, for example grinding, honing or other hard finishing operations. Furthermore, while the present invention has been described with respect to workpiece holding, the invention may also be applicable to holding of tools, especially in regard to the exchange of like tools such as when a worn tool is exchanged for a new or sharpened tool.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A chuck device comprising:
at least two first jaw members movable generally toward and away from one another, each first jaw member having a fixed gripping member and an opposed gripping member,
said opposed gripping member being movable between an open position and a closed position, said opposed gripping member comprising a first end and a second end, said first end being pivotable whereby said opposed gripping member is movable between said open position and said closed position, said second end being a gripping end,
said fixed gripping member and said opposed gripping member being operable to grip and release a first end of a second jaw member having a second end thereof configured to grip an object,
whereby gripping and releasing by the first jaw members is carried out in a tool-less manner.

2. The chuck of claim 1 wherein said at least two first jaw members are positioned on a chuck body.

3. The chuck of claim 2 wherein said chuck body includes movable means on which said at least two first jaw members are positioned whereby said at least two first jaw members are movable generally toward and away from one another.

4. The chuck of claim 1 further including a second jaw member positioned on each of said first jaw members, said second jaw member being held in a releasable manner on the first jaw members via said fixed gripping member and said opposed gripping member, said second jaw member being gripped and released from the first jaw member in a tool-less manner.

5. The chuck of claim 4 wherein said second jaw member comprises a first end and a second end, said first end being configured to be gripped by said first jaw member and said second end being of a shape complementary to at least a portion of a predetermined object to be gripped by said chuck.

6. The chuck of claim 5 wherein each first jaw member includes a planar surface which together with the fixed gripping member and the opposed gripping member in said closed position defines a pair of opposed grooves, said first end of said second jaw member comprising first and second shoulder portions shaped complementary with respective ones of said pair of opposed grooves whereby said shoulder portions are inserted into said grooves to thereby secure said second jaw member to said first jaw member.

7. The chuck of claim 6 wherein the opposed gripping member and the respective shoulder portion of the second jaw member engage in a snap-fit manner.

8. The chuck of claim 5 wherein said second end of said second jaw member is of a shape complementary to a bevel pinion or a bevel ring gear.

9. The chuck of claim 1 wherein said opposed gripping member is held in a closed gripping position by at least one spring.

10. The chuck of claim 1 wherein said opposed gripping member held in a closed gripping position by a threaded pin with a manually tightened knob.

* * * * *